United States Patent
Groβ et al.

(10) Patent No.: US 8,100,316 B2
(45) Date of Patent: Jan. 24, 2012

(54) METHOD FOR JOINING AIRCRAFT FUSELAGE ELEMENTS BY FRICTION STIR WELDING (FSW)

(75) Inventors: Dirk Groβ, Stade (DE); Robert Alexander Goehlich, Hamburg (DE); Steffen Biesek, Hamburg (DE); Rolf Bense, Jork (DE)

(73) Assignee: Airbus Operations GmbH, Hamburg (DE)

( * ) Notice: Subject to any disclaimer, the term of this patent is extended or adjusted under 35 U.S.C. 154(b) by 102 days.

(21) Appl. No.: 12/453,296

(22) Filed: May 6, 2009

(65) Prior Publication Data

US 2009/0294018 A1  Dec. 3, 2009

Related U.S. Application Data

(60) Provisional application No. 61/056,842, filed on May 29, 2008.

(51) Int. Cl.
*B23K 20/12* (2006.01)
(52) U.S. Cl. .................................................. 228/112.1
(58) Field of Classification Search .................. None
See application file for complete search history.

(56) References Cited

U.S. PATENT DOCUMENTS

| 6,051,325 | A * | 4/2000 | Talwar et al. | 428/593 |
| 6,105,902 | A * | 8/2000 | Pettit | 244/119 |
| 6,450,394 | B1 * | 9/2002 | Wollaston et al. | 228/112.1 |
| 6,581,819 | B1 | 6/2003 | Aota et al. | |
| 7,115,324 | B1 * | 10/2006 | Stol et al. | 428/594 |
| 7,500,640 | B2 * | 3/2009 | Tanaka et al. | 244/123.7 |
| 2001/0038057 | A1 * | 11/2001 | Palm | 244/119 |
| 2001/0052561 | A1 * | 12/2001 | Wollaston et al. | 244/132 |
| 2003/0226935 | A1 * | 12/2003 | Garratt et al. | 244/123 |
| 2004/0050907 | A1 * | 3/2004 | Dracup et al. | 228/112.1 |
| 2004/0055349 | A1 * | 3/2004 | El-Soudani | 72/56 |
| 2004/0194942 | A1 * | 10/2004 | Okamoto et al. | 165/170 |
| 2005/0040209 | A1 * | 2/2005 | Stotler et al. | 228/102 |
| 2005/0045693 | A1 * | 3/2005 | Buchheit et al. | 228/112.1 |
| 2005/0210820 | A1 * | 9/2005 | Tanaka et al. | 52/730.6 |
| 2006/0027630 | A1 * | 2/2006 | Talwar et al. | 228/112.1 |
| 2006/0027631 | A1 * | 2/2006 | Day et al. | 228/112.1 |
| 2006/0108474 | A1 * | 5/2006 | Tanaka et al. | 244/132 |
| 2006/0191979 | A1 * | 8/2006 | Lohwasser | 228/112.1 |
| 2007/0040002 | A1 * | 2/2007 | Talwar | 228/101 |
| 2007/0044406 | A1 * | 3/2007 | Van Aken et al. | 52/459 |

(Continued)

FOREIGN PATENT DOCUMENTS

JP  2001-246482 A  * 11/2001

(Continued)

*Primary Examiner* — Kiley Stoner
(74) *Attorney, Agent, or Firm* — Jenkins, Wilson, Taylor & Hunt, P.A.

(57) ABSTRACT

The invention relates to a method for joining at least two aircraft fuselage segments (2, 3) by friction stir welding with a tool (8) generating friction heat for the partial plasticisation of an edge region (6, 7) of at least one of the two aircraft fuselage segments and a counter bearing (10) for absorbing the force exerted by the tool (8) on at least one of the two aircraft fuselage segments, wherein at least one of the two aircraft fuselage segments comprises at least one rib (17) and/or one stringer (16).

In order to minimise the necessary expense incurred in association with the production aids for the FSW process, it is proposed that the at least one rib (17) and/or the at least one stringer (16) of the at least one aircraft fuselage segment (2, 3) should be used as a counter bearing (10).

6 Claims, 2 Drawing Sheets

U.S. PATENT DOCUMENTS

| | | | |
|---|---|---|---|
| 2007/0128463 A1* | 6/2007 | Dixon et al. | 428/654 |
| 2007/0138236 A1* | 6/2007 | Agarwal et al. | 228/112.1 |
| 2007/0215675 A1* | 9/2007 | Barnes | 228/112.1 |
| 2007/0266536 A1* | 11/2007 | Burton et al. | 29/428 |
| 2008/0047222 A1* | 2/2008 | Barnes | 52/693 |
| 2008/0173755 A1* | 7/2008 | Benthien | 244/118.1 |
| 2008/0202066 A1* | 8/2008 | Arsene et al. | 52/793.11 |
| 2008/0265094 A1* | 10/2008 | Van Der Veen et al. | 244/123.1 |
| 2008/0296433 A1* | 12/2008 | Brenner et al. | 244/129.1 |
| 2009/0184201 A1* | 7/2009 | Talwar et al. | 244/119 |
| 2009/0188968 A1* | 7/2009 | Marie | 228/112.1 |
| 2009/0200423 A1* | 8/2009 | Tucker | 244/123.1 |
| 2009/0263676 A1* | 10/2009 | Litzenberger et al. | 428/626 |
| 2009/0266936 A1* | 10/2009 | Fernandez et al. | 244/119 |
| 2009/0283509 A1* | 11/2009 | Frauen et al. | 219/121.85 |
| 2009/0311549 A1* | 12/2009 | Fernandez et al. | 428/594 |
| 2010/0001133 A1* | 1/2010 | Kempa et al. | 244/118.6 |
| 2010/0006622 A1* | 1/2010 | Smith et al. | 228/2.1 |
| 2010/0006700 A1* | 1/2010 | Stuhr et al. | 244/123.1 |
| 2010/0037998 A1* | 2/2010 | Bray et al. | 148/690 |
| 2010/0038489 A1* | 2/2010 | Bense et al. | 244/131 |
| 2010/0065534 A1* | 3/2010 | Schmidt et al. | 219/121.14 |
| 2010/0068550 A1* | 3/2010 | Watson et al. | 428/586 |
| 2010/0092789 A1* | 4/2010 | Heck et al. | 428/457 |
| 2010/0196733 A1* | 8/2010 | Stephan | 428/544 |

FOREIGN PATENT DOCUMENTS

WO    WO 98/58759    12/1998

* cited by examiner

METHOD FOR JOINING AIRCRAFT FUSELAGE ELEMENTS BY FRICTION STIR WELDING (FSW)

This application claims the benefit of U.S. Provisional Application No. 61/056,842 filed 29 May 2008, the entire contents of each of which are hereby incorporated by reference.

The invention relates to a method for joining aircraft fuselage elements by friction stir welding according to the introductory clause of claim 1.

Friction stir welding which is generally known today is used, inter alia, in aircraft construction as a cost-effective and efficient alternative to the riveting process. FSW is used today in aircraft construction in the field of individual component production. For major component assembly (MCA) and the final assembly line (FAL) it has not yet been possible, however, to realise this type of welding with the designs and structures of existing installations and production means.

With regard to FSW a distinction is made between two different tools, the single shoulder tool and the double shoulder tool (bobbin tool). Both tools require so-called production aids in order to firstly bring components provisionally into position and to keep them in position during the joining process and secondly in order to absorb counter forces of the joining process.

The production means for single shoulder tools and so-called bobbin tools are different. In the case of the single shoulder tool production means are needed for positioning and absorbing the counter forces. In the case of the bobbin tool the production means are required merely for positioning.

After use the production aids must be removed again from the component, as production aids for assembly processes are not in principle airworthy components. It is thus necessary to assemble and dismantle the production aids which is often complex and requires extensive resources, particularly in the case of limited access to the points at which the production means are required.

It can thus be concluded in summary that production aids are required for today's processes which comprise individual or a plurality of parts in order to fulfil the process requirements. The solutions known to date are based on the principle of removing the production aids after the FSW joining process. The complex installation and size of the production means often lead to problems with access to the points to be machined. This results in requirements for incorporation and removal of the production means and thus at the same time high costs. A further disadvantage is the reusability of the production means in case of changes of components. Changes to the component generally require a modification or new development of the production means. The costs arising from changes in the production means may possibly lead to changes in the components not being carried out.

It is an object of the present invention to indicate a manufacturing process, in which the resources required in association with the production aids for the friction welding processes are minimised.

This object is achieved through the method according to claim 1. Preferred embodiments of the invention are the subject matter of the dependent claims.

The invention is based on the finding that in practice the components to be joined in the field of MCA and FAL are generally fuselage segments and the joining points in question are transverse and longitudinal seams. In these areas therefore the airworthy components can replace the production aids for FSW. Airworthy components on the parts (segments) to be joined are generally structural reinforcing elements, i.e. in particular stringers and ribs fixed to the fuselage segments. Besides the stringers and ribs fixedly joined to the fuselage segments, corresponding coupling elements can also be used for friction stir welding, i.e. stringer and rib sections, which during joining are used as a transition between two corresponding fuselage segments. In any case the reinforcing elements must be of corresponding structural design to be considered for use with FSW. Components of this type are those which satisfy the conditions of the production aids, i.e. they can absorb counter forces and position the components and simultaneously assume the flight-technical properties without having to be removed from the component again.

The method according to the invention for joining at least two aircraft fuselage segments through friction stir welding with a tool generating friction heat for partial plasticisation of an edge region of at least one of the two aircraft fuselage segments and a counter bearing for absorbing the force exerted by the tool on at least one of the two aircraft fuselage segments, wherein at least one of the two aircraft fuselage segments comprises at least one rib and/or one stringer, is characterised in that the at least one rib and/or the at least one stringer of the at least one aircraft fuselage segment is used as a counter bearing.

The at least one rib on at least one of the two aircraft fuselage segments is preferably dimensioned so that it can absorb the forces of the flying operation and the counter forces which arise within the scope of the friction stir welding. As a result it is no longer necessary to use any aids at all in the production.

In particular the rib is thereby an annular rib which comprises a plurality of parts.

The same applies to the stringer in that the at least one stringer on at least one of the two aircraft fuselage segments has such dimensions that it can absorb the forces of the flying operation and the counter forces which arise within the scope of the friction stir welding.

The method according to the invention has, inter alia, the advantage that the positioning of the components is realised automatically during the joining process. Through the orientation of the airworthy reinforcing elements the components (fuselage segments) are positioned relative to each other, whereby it is no longer necessary to position the segments separately in relation to a production aid. In addition the component construction and seam design are optimised for production. Furthermore, component changes no longer require a change in the production aid, meaning that modifications of the components can be incorporated more quickly. Procurement, repair and maintenance of cost-intensive production aids do not arise either, meaning that the saving potential is also exhausted in this respect. In addition the welding process according to the invention in the MCA and FAL assembly allows the running time to be reduced, costs to be reduced and weight to be reduced through a new type of seams, i.e. reduction of weight through the use of FSW in the MCA/FAL assembly. The component design as a whole becomes more flexible, as an inner system of production aids is not necessary in the closed component structure and therefore a separate construction area for the seam production is not necessary. As expensive production aid structures are no longer necessary in the inner area it is possible to work in parallel on the sections.

Further advantages and features of the invention ensue from the following description of exemplified embodiments, whereby reference is made to the attached drawing, in which.

The drawing is not true to scale. Elements that are the same or have the same effect have been given the same reference numerals.

Figure 1:
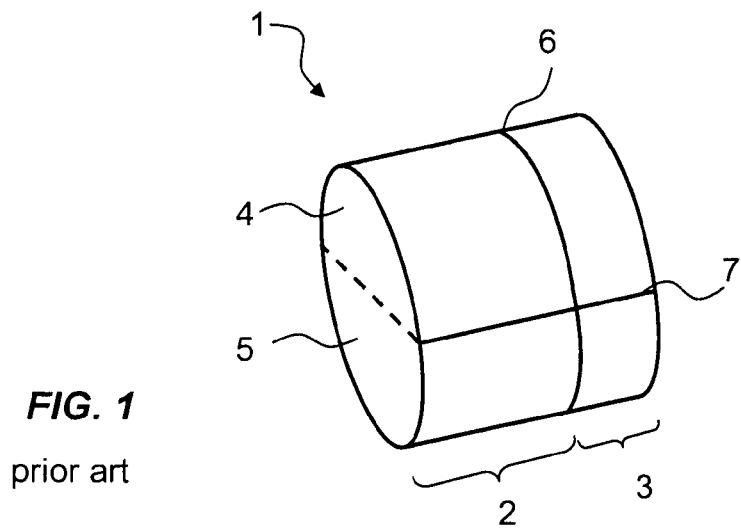
FIG. 1 shows, schematically, weld seams of a section of an aircraft fuselage shown in a perspective view, in which the method according to the invention can be used.

FIG. 1 shows a section of an aircraft fuselage schematically. The aircraft fuselage is generally produced from a plurality of individual segments. These individual segments can be joined transversely for the subsequent aircraft fuselage or longitudinally for the subsequent aircraft fuselage. Accordingly, FIG. 1 shows for the purpose of clarification a front segment 2 and a rear segment 3 as well as an upper segment 4 and a lower segment 5. The front and the rear segment 2 and 3 are connected to each other by a vertical intermediate seam 6. The upper and the lower segment 4 and 5 are similarly connected to each other by a horizontal intermediate seam 7.

Figure 2:
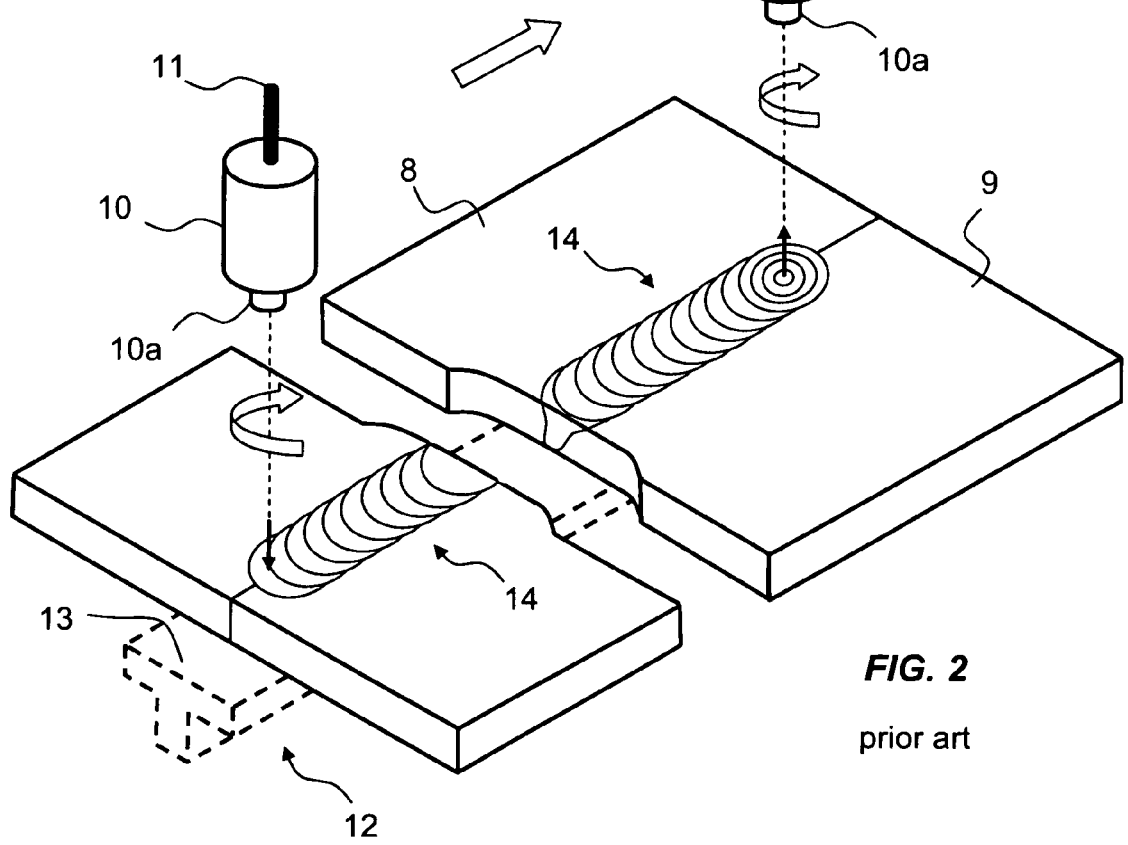
FIG. 2 shows a FSW tool in a perspective view with a counter bearing and two components to be joined according to the prior art.

The connection between the segments and the production of the respective intermediate seam between the individual segments will now be clarified by reference to FIG. 2. FIG. 2 shows a tool 10 which heats two parts to be connected in their respective edge regions 8 or 9 through friction until the material liquefies (plasticisation). The tool 10 in the embodiment according to FIG. 2 is a cylinder rotating quickly around its own axis, as indicated by a curved arrow. The cylinder 10 is preferably pressed simultaneously against the two edge regions 8 and 9 and driven by a drive shaft 11. At its lower end there is a pin element 10a, with which the tool is inserted into the join between the two metal sheets 8 and 9. As a result of the friction arising during rotation of the tool the adjacent material is liquefied, whereby the tool is moved along the join between the two sheets 8 and 9, which is indicated in the drawing with an arrow. A weld seam 14 is produced through this process. The weld seam 14 is indicated as a series of circular liquid material areas, whereby the depth of the weld seam can be seen in the recessed section of the sheets in the middle of the drawing. The weld seam 14 extends ideally vertically over the whole thickness of the sheet 8 or 9 but not beyond this, as according to the prior art the sheets are not be welded to objects lying behind. This is clarified further below. Once the weld seam 14 is complete the tool is removed from the two workpieces 8 and 9. The process is shown schematically in FIG. 2 from the beginning (left in the drawing) to the end (right in the drawing).

In order to absorb the forces arising during the friction process a counter bearing 12 is provided which absorbs these forces. The two essentially acting forces are thereby a force which is exerted through the pressure of the tool 10 and leads to bending of the edge regions 8 and 9 downwardly, and a force which acts tangentially in relation to the rotational movement of the tool 10 and forces the two edge regions 8 and 9 out of the middle. The counter bearing 12 therefore includes a bearing surface 13, through which the edge regions 8 and 9 of the two parts to be joined are supported and which prevent, in association with the friction cylinder 10, the edge regions 8 and 9 from moving out of the middle. As the counter bearing 12 can be removed without further resources upon completion of the welding process, the depth of the weld seam 14 is not greater than the thickness of the sheets 8 and 9. On the other hand, the depth of the weld seam must not be smaller, or only be insignificantly smaller, than the thickness of the sheets 8 and 9, as otherwise the weld seam constitutes a mechanical weak point ("lack of penetration").

Figure 3:
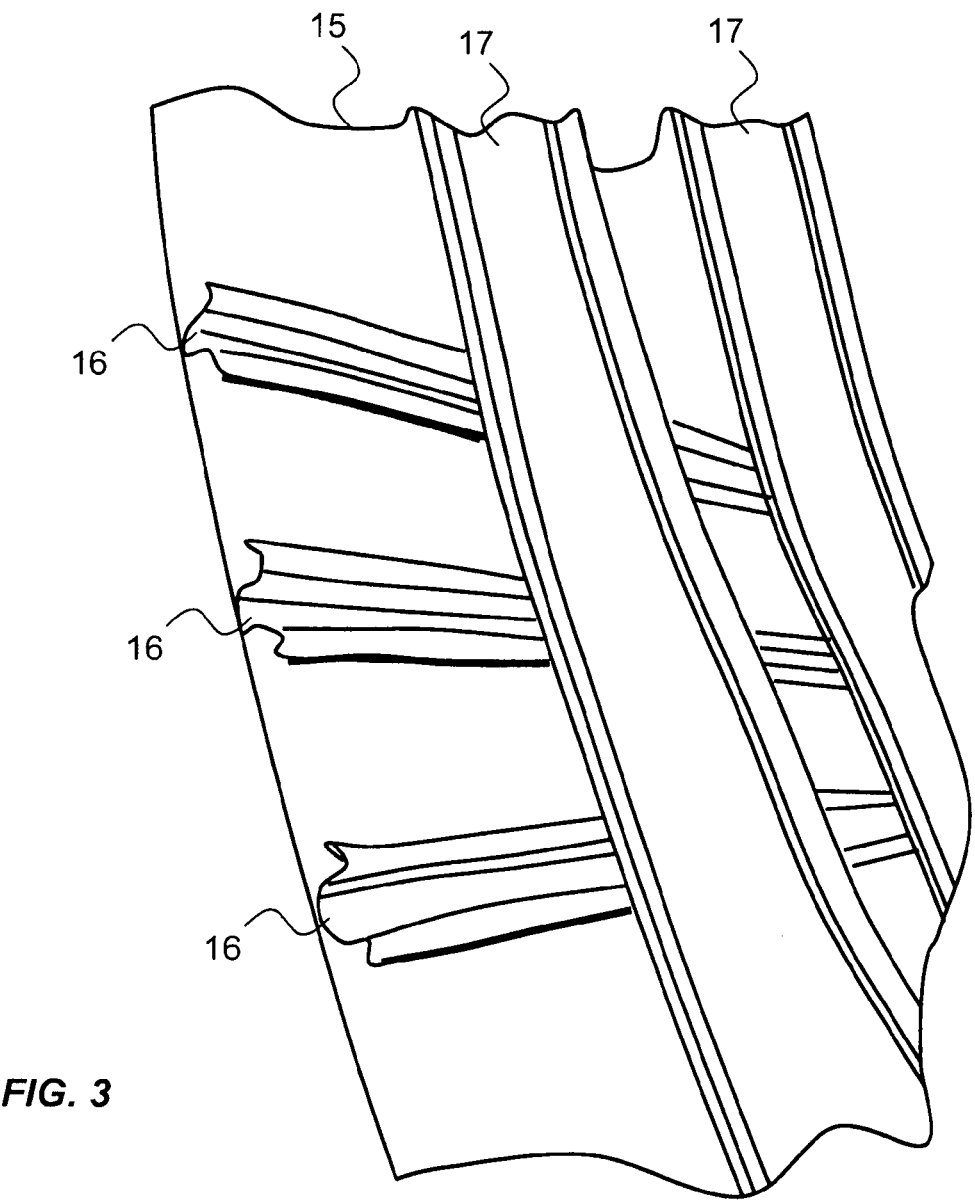
FIG. 3 shows in a perspective view a cutout from an aircraft fuselage segment with ribs and stringers according to the prior art.

According to the invention a part of an airworthy element is proposed as a counter bearing 12 with a bearing surface 13. Ribs and stringers can hereby be used for the segments to be joined. These are shown in FIG. 3 in the illustration of a cutout 15 of an aircraft fuselage. The aircraft fuselage and its part segments 15 are reinforced in longitudinal and transverse direction by stringers 16 and ribs 17 respectively in order to improve the mechanical stability of the fuselage and thus to prevent for example mechanical vibrations under load conditions. While the stringers 16 extend essentially parallel to the longitudinal axis of the aircraft from the front to the rear, the ribs 17 extend around the periphery of the fuselage. They are thus also known as annular ribs. The stringers 16 are generally formed as rail-like elements, i.e. they constitute a channel which overhangs at the top end on both sides and has a depression in the middle. Further possible (not shown) profiles of the stringers 16 are omega profile, T profile, C profile and I profile.

It can thus be easily concluded for the person skilled in the art that the following steps are carried out in order to produce a transverse seam or vertical intermediate seam 6 in FIG. 1. In a first step, instead of the usual transverse butt strap known according to the prior art (not shown), an annular rib 17 which may consist of a plurality of parts is incorporated, i.e. welded, riveted or fastened. This annular rib 17 has such dimensions that it can absorb the forces of the flying operation and the counter forces which arise in the friction stir welding process. In a second step the second section 8 or 9 is then pushed on to the strap or the rib 17 and subsequently welded, as explained in connection with FIG. 2.

A similar principle can be used for the longitudinal seam or horizontal intermediate seam 7. Instead of a lap joint a corresponding stringer 16 or similar component is used on the fuselage segment 16 as a reinforcing element. The stringer 16 or the similar component is used to compensate for the forces arising in the welding process. The stringer 16 is preferably already built into the individual part 15 in the pre-manufacturing stage (skin production).

Figure 4:
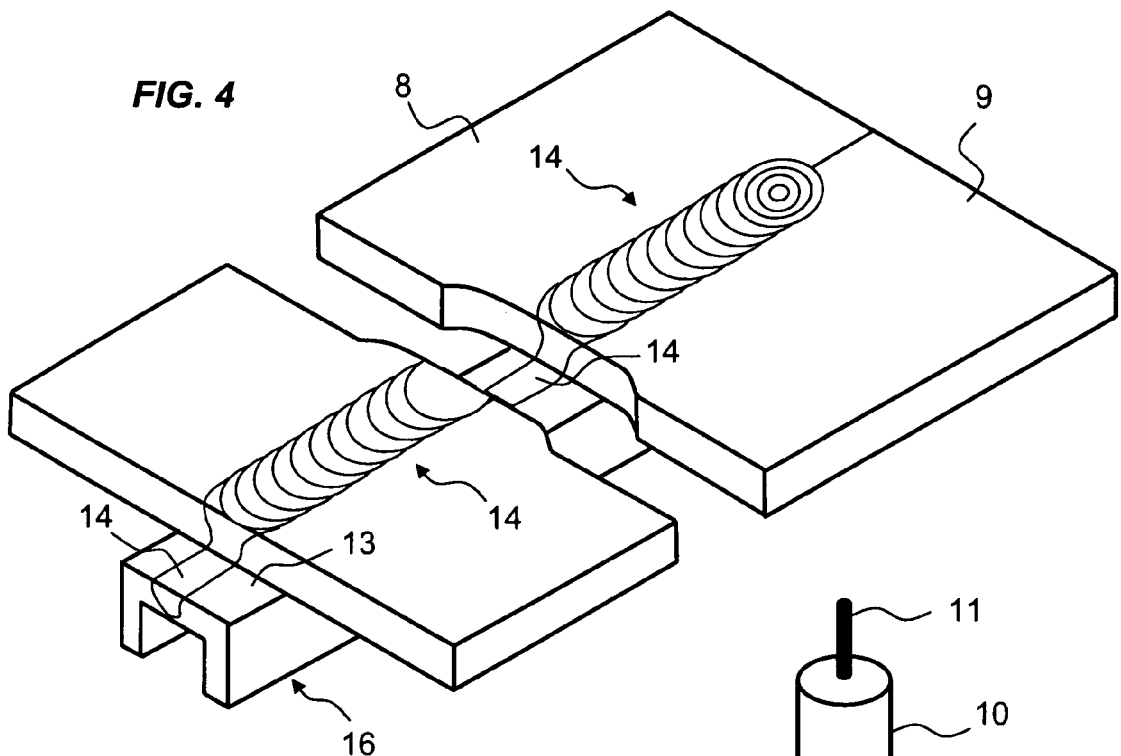
FIG. 4 shows in a perspective view a welded seam according to the method according to the invention.

The result of the method according to the invention is shown in FIG. 4 which shows essentially the same elements as FIG. 2, except that no separate counter bearing is provided here. Instead this is replaced by the stringer 16. As can be seen in FIG. 4, the weld seam extends in this case over the thickness of the two sheets 8 and 9 and beyond into the stringer 16, meaning that not only the two sheets 8 and 9 are joined to each other but also the stringer 16 is joined to the two sheets 8 and 9. Optimal strength is thus achieved in the composite structure.

REFERENCE NUMERALS

1 Aircraft fuselage section
2 Front aircraft fuselage segment
3 Rear aircraft fuselage segment
4 Upper aircraft fuselage segment
5 Lower aircraft fuselage segment
6 Vertical intermediate seam
7 Horizontal intermediate seam
8 First edge region
9 Second edge region
10 Tool
11 Shaft
12 Counter bearing 13 Bearing surface
14 Weld seam
15 Fuselage outer skin
16 Stringer
17 Rib

The invention claimed is:

1. A method for joining at least two aircraft fuselage segments, the method comprising:
   friction stir welding with a tool generating friction heat for at least partial plasticisation of a weld seam comprising adjacent edge regions of the at least two aircraft fuselage segments and a counter bearing for resisting force exerted by the tool on at least one of the at least two aircraft fuselage segments;
   wherein the counter bearing comprises at least one airworthy component; and
   wherein the friction stir welding tool plasticises only a portion of the interface between the counter bearing and the adjacent edge regions, and wherein the weld seam extends only partly into said counter bearing.

2. The method according to claim 1, wherein the counter bearing comprises at least one rib on at least one of the two aircraft fuselage segments, wherein said rib is dimensioned so that it can absorb the forces of flying operation and the counter forces which arise during friction stir welding.

3. The method according to claim 2, wherein the rib is an annular rib which comprises a plurality of parts.

4. The method according to claim 1, wherein the counter bearing comprises at least one stringer on at least one of the two aircraft fuselage segments, wherein said stringer is dimensioned so that it can absorb the forces of flying operation and the counterforces which arise during friction stir welding.

5. A method for joining at least two aircraft fuselage segments, the method comprising:
   friction stir welding with a tool generating friction heat for partial plasticisation of a weld seam comprising adjacent edge regions of said at least two aircraft fuselage segments and a counter bearing for resisting force exerted by the tool on at least one of the at least two aircraft fuselage segments,
   wherein a rib in the edge region is used as said counter bearing; and
   wherein the friction stir welding tool plasticises only a portion of an interface between the rib and the adjacent edge regions and wherein the weld seam extends at least partly into said rib.

6. A method for joining at least two aircraft fuselage segments, the method comprising:
   friction stir welding with a tool generating friction heat for partial plasticisation of a weld seam comprising adjacent edge regions of said at least two aircraft fuselage segments and a counter bearing for resisting force exerted by the tool on at least one of the at least two aircraft fuselage segments,
   wherein a stringer in the edge region is used as said counter bearing; and
   wherein the friction stir welding tool plasticises only a portion of an interface between the stringer and the weld seam extends at least partly into said stringer.

* * * * *